US007765289B2

(12) United States Patent
Park

(10) Patent No.: US 7,765,289 B2
(45) Date of Patent: Jul. 27, 2010

(54) COMMUNICATION METHOD FOR DEVICE IN NETWORK SYSTEM AND SYSTEM FOR MANAGING NETWORK DEVICES

(75) Inventor: Hyun-wook Park, Gwacheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 549 days.

(21) Appl. No.: 11/678,762

(22) Filed: Feb. 26, 2007

(65) Prior Publication Data
US 2007/0283013 A1 Dec. 6, 2007

(30) Foreign Application Priority Data
Jun. 5, 2006 (KR) .................... 10-2006-0050437

(51) Int. Cl.
*G06F 15/13* (2006.01)
(52) U.S. Cl. .................. 709/223; 709/224; 709/238; 709/245; 709/249; 370/352
(58) Field of Classification Search ............... 709/223, 709/224, 238, 245, 249; 370/352
See application file for complete search history.

(56) References Cited
U.S. PATENT DOCUMENTS
6,345,303 B1 * 2/2002 Knauerhase et al. ........ 709/238

| | | | |
|---|---|---|---|
| 7,486,663 B2 * | 2/2009 | Matsuda et al. | 370/352 |
| 2002/0161904 A1 * | 10/2002 | Tredoux et al. | 709/229 |
| 2005/0076141 A1 * | 4/2005 | Williams et al. | 709/245 |
| 2005/0144327 A1 * | 6/2005 | Rabie et al. | 709/249 |

* cited by examiner

*Primary Examiner*—Jinsong Hu
(74) *Attorney, Agent, or Firm*—Staas & Halsey LLP

(57) ABSTRACT

A communication method for a device in a network system and a system for managing network devices are disclosed. The communication method for a device in a network system includes connecting a management server that manages at least one device in an internal network, the at least one device, and a designated device with one another through a firewall, the internal network, and an external network; the designated device maintaining a connection with the management server; and if a message for requesting a connection with a target device among the at least one device is received by the designated device from the management server, the designated device forwarding the received message to the target device. According to this method, the management server can connect and communicate with managed devices, whenever necessary, by making the designated device connected to the network continuously maintain the connection with the management server.

20 Claims, 8 Drawing Sheets

COMMUNICATION METHOD FOR DEVICE IN NETWORK SYSTEM AND SYSTEM FOR MANAGING NETWORK DEVICES

CROSS-REFERENCE TO RELATED APPLICATIONS

This application claims all benefits accruing under 35 U.S.C. §119 from Korean Patent Application No. 2006-50437, filed on Jun. 5, 2006 in the Korean Intellectual Property Office, the disclosure of which is incorporated herein by reference.

BACKGROUND OF THE INVENTION

1. Field of the Invention

Aspects of the present invention relate to a communication method for a device in a network system and a system for managing network devices; more particularly, to a communication method for a device in a network system and a system for managing network devices which allow a management server on an external network to initiate communication with devices on an internal network by selecting and designating one of the devices to maintain a connection with the management server.

2. Related Art

A network printing system is a system in which multiple user terminals share at least one image forming device connected through an internal office or home network. A user requests an operation related to image forming, such as printing a document, to a desired image forming device among the pool of image forming devices.

Generally in a network printing system the management of multiple image forming devices is performed by a management server. The management server monitors the state of the image forming devices via a network, such as the Internet, and controls the image forming devices based on the state information transmitted from the image forming devices.

The image forming devices report their state information (e.g., current amount of toner, the number of printed pages) by transmitting to the management server at scheduled times. After an image forming device initiates a connection, via the network, to the management server, the management server receives the state information of the image forming device, transmits new schedule information or a desired command to the image forming device, and then terminates the connection.

In the network printing system described above, however, a management server located on an external network cannot initiate communication to an image forming device located on an internal network behind a firewall and must wait for the image forming device to connect with the management server at a scheduled time. The firewall protects the local network and the image forming devices from externally initiated connections. The firewall permits connections from inside the local network to outside the external network but restricts access initiated from the external network to the local network. For the management server located on the external network to issue a command to or update a schedule on a specific image forming device, the management server must wait for the required image forming device to initiate a connection to the management server, thus delaying a response to the command or update until the scheduled time.

SUMMARY OF THE INVENTION

Several aspects and example embodiments of the present invention provide a communication method for a device in a network system, which makes it possible for a management server to request a connection with a device connected to a network and promptly connect to the device without waiting for the device to connect with the management server on a predetermined schedule.

Aspects and example embodiments of the present invention additionally further provide a system to manage network devices, which makes it possible for a management server to request a connection with a device connected to a network and promptly connect to the device without waiting for the device to connect with the management server on a predetermined schedule.

Additional aspects and/or advantages of the invention will be set forth in part in the description which follows and, in part, will be obvious from the description, or may be learned by practice of the invention.

In accordance with an example embodiment of the present invention, a communication method for a device in a network system comprises: managing devices on an internal network with a management server on an external network, where access to the internal network from the external network is restricted by a firewall; connecting to and maintaining a connection with the management server via a designated device on the internal network; and forwarding a request or a message to a target device on the internal network, via the designated device, when the management server requests to communicate with or send a message to one of the devices on the internal network.

According to an aspect of the present invention, the communication method may further include connecting the target device to the management server after the target device receives a request to communicate forwarded from the designated device, and responding to additional requests or messages transmitted from the management server to the target device.

According to an aspect of the present invention, the communication method may further include where the designated device receives the request or the message from the management server to be forwarded to a target device, analyzes the request or the message, and forwards the request or message to the target device, if the designated device determines that the received request or the message corresponds to the target device.

According to an aspect of the present invention, the communication method may further include where the management server selects and designates any device on the internal network to first connect and register with the management server as the designated device, so as to maintain a connection with the management server.

According to an aspect of the present invention, the communication method may further include where the management server analyzes the registration and the state information reported by the devices on the internal network and then, based on the analysis, selects and designates a device to maintain a connection with the management server.

According to an aspect of the present invention, the communication method may further include where the management server, based on the state information received from the target device, requests a connection to the target device, and the designated device forwards the request for the connection to the target device.

According to an aspect of the present invention, the communication method may further include where the management server and the designated device remain connected for a predetermined time period, and this time period is extendable.

According to an aspect of the present invention, the communication method may further include where the management server, the designated device, and the at least one of the one or more target devices communicate via TCP/IP (Transmission Control Protocol/Internet Protocol).

According to an aspect of the present invention, the communication method may further include where one or more of the devices managed on the internal network are image forming devices.

According to an aspect of the present invention, the communication method may further include where the designated device is an image forming device.

In accordance with another example embodiment of the present invention, a network system is provided: at least one target device connected to an internal network; a management server connected to an external network; a firewall disposed between the internal and external network; and a designated device connected to the internal network, and arranged to maintain a connection with the management server on behalf of the at least one target device, and forward requests and messages from the management server to the at least one target device.

According to an aspect of the present invention, the network system may further include where the designated device comprises: a device communication unit to receive the requests and the messages, and transmit the requests and the messages to the at least one target device; a message processing unit to confirm receipt of the requests and the messages, and forward the requests and messages to the at least one target device corresponding to the received requests and the messages, via the device communication unit; a registration/connection control unit to connect to and maintain a connection with the management server, via the device communication unit; a database to store the registration and the state information of the designated device; and an information providing unit to retrieve the registration and the state information from the database, and report the registration and the state information to the registration/connection control unit, when requested by the registration/connection control unit.

According to an aspect of the present invention, the network system may further include where the designated device connects to and maintains a connection with the management server if the device receives a message that the management server has selected and designated the device to create and maintain a connection.

According to an aspect of the present invention, the network system may further include where the wherein the at least one target device comprises: a device communication unit to receive the requests and the messages, and provide the requests and the messages to the registration/connection control unit; a message processing unit to confirm receipt of the requests and the messages, and provide the requests and messages to the registration/connection control unit; a registration/connection control unit to connect to the management server, via the device communication unit; a database to store the registration and the state information of the target device; and an information providing unit to retrieve the registration and the state information from the database, and report the registration and the state information to the registration/connection control unit, when requested by the registration/connection control unit.

According to an aspect of the present invention, the network system may further include where the at least one target device connects to the management server after receiving a connection request from the management server forwarded from the designated device, and responds to the requests of the management server after connecting to the management server.

According to an aspect of the present invention, the network system may further include where the management server comprises: a server communication unit to send the requests and the messages, and receive the state information, via connections formed by devices on the internal network; a device selection unit to select the designated device, and generate a message for the selected device informing the selected device that the selected device has been designated; a device management unit to, based on state information stored in the management server database, issue the requests and messages to devices on the internal network, via the server communication unit; a message generation unit to, when directed by the device management unit, send connection requests to the at least one target device on the internal network, via the server communication unit; and a database to store the registration and the state information of the designated device and the at least one target device.

According to an aspect of the present invention, the network system may further include where the management server selects and designates any device on the internal network to first connect and register with the management server as the designated device, so as to maintain a connection with the management server.

According to an aspect of the present invention, the network system may further include where the management server analyzes the registration and the state information reported by the devices on the internal network and then, based on the analysis, selects and designates one of the devices on the internal network to maintain a connection with the management server.

According to an aspect of the present invention, the network system may further include where the management server and the designated device are connected together for a predetermined time period, and this time period for connection is extendable.

According to an aspect of the present invention, the network system may further include where the management server, the designated device, and the at least one of the one or more target devices communicate via TCP/IP (Transmission Control Protocol/Internet Protocol).

According to an aspect of the present invention, the network system may further include where at least one of the one or more target device is an image forming device.

According to an aspect of the present invention, the network system may further include where the designated device is an image forming device.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
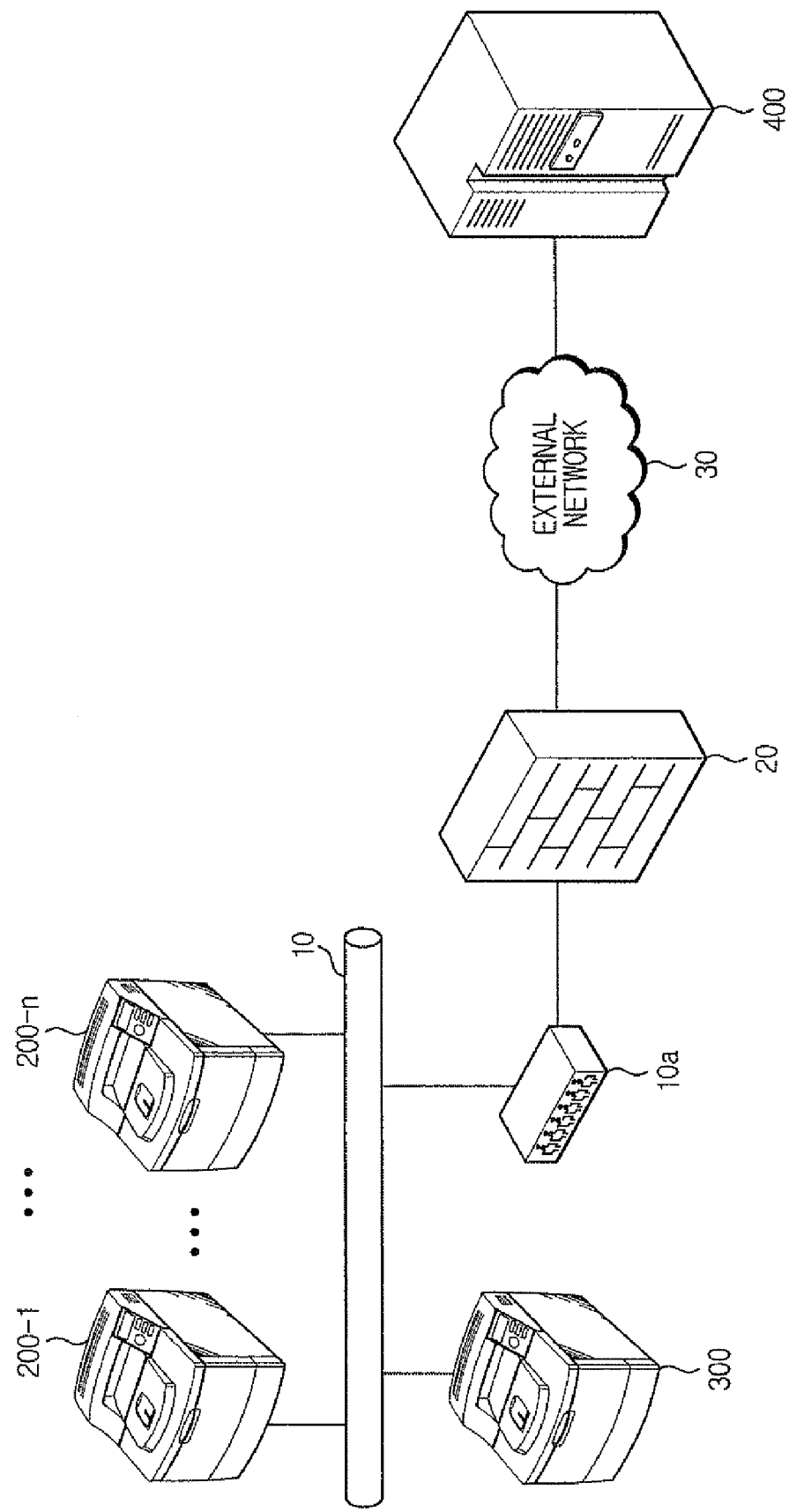
FIG. 1 illustrates a system for managing network devices according to an example embodiment of the present invention.

Reference will now be made in detail to example embodiments of the present invention which are illustrated in the accompanying drawings, wherein like reference numerals refer to the like elements throughout. The embodiments of the invention are not limited to those shown in the drawings, and various changes in form and details may be made therein without departing from the spirit and scope of the present invention. The embodiments are described below in order to explain the present invention by referring to the figures.

Several aspects and example embodiments of the present invention will be described in detail with reference to the accompanying drawings. In the drawings, the same elements are denoted by the same reference numerals throughout the drawings. In the following description, detailed descriptions of known functions and configurations incorporated herein have been omitted for conciseness and clarity.

FIG. 1 illustrates a system for managing network devices according to an example embodiment of the present invention. Referring to FIG. 1, a system for managing network devices includes at least one device 200-1 . . . 200-n (where n is a constant of 1 or greater), a designated device 300, and a management server 400.

Both the designated device 300 and the devices 200-1 . . . 200-n are connected through a group network 10, such as a local area network (LAN) or personal area network for use at an office or home network, and may be image forming devices, such as printers, facsimile machines, photocopiers, and multi-function products. The group network 10 may be constructed by a gateway 10a and a LAN.

The management server 400 is a server that manages both the designated device 300 and the devices 200-1 . . . 200-n on the basis of registration information and state information of the designated device 300 and the devices 200-1 . . . 200-n. That is, the management server 400 collects the state information from the designated device 300 and the devices 200-1 . . . 200-n registered in the management server 400, and manages the designated device 300 and the devices 200-1 . . . 200-n by sending various kinds of commands and schedule information on the basis of the collected state information. The management server 400 is communicably connected with the designated device 300 and the devices 200-1 . . . 200-n through a group network 10, a firewall 20, and an external network 30.

The firewall 20 prevents an external device from connecting to the group network 10 from the external network 30. In an aspect of the present invention, the devices 200-1 . . . 200-n request registration to the management server 400, and then connect with the management server 400 at a scheduled time to report state information to the management server 400. The management server 400 may set the scheduled time, or the devices themselves may set the scheduled time.

By contrast, the designated device 300 can be any device on the group network 10 that is selected and designated by the management server 400. Such a designated device 300 can maintain the connection with the management server 400 on behalf of the devices 200-1 . . . 200-n. If a connection request message requesting the connection with a specific device among the devices 200-1 . . . 200-n (hereinafter referred to as the "target device 200-x" where x represents the number from 1 to n representing the specific device the management server wishes to connect to) is sent from the management server 400, the designated device 300 forwards the connection request message to the target device 200-x that corresponds to the forwarded message from the management server 400, via the group network 10. The target device 200-x will then connect and communicate with the management server 400 in accordance with the forwarded connection request message even though the scheduled time for the target device 200-x to communicate with the management server 400 has not arrived.

That is, the management server 400 can communicate with a target device 200-x by sending a request message to the designated device 300, without the necessity of waiting for the scheduled time for the target device 200-x, with which the management server 400 desires to communicate, to connect to the management server 400.

In one example embodiment of the present invention, the designated device 300 is not among the managed at least one device 200-1 . . . 200-n. In another example embodiment of the present invention, the device 300 is selected from the at least one device 200-1 . . . 200-n and becomes a designated device 300 and maintains a connection with the management server 400, but the designated device 300 would return to being one of the at least one device 200-1 . . . 200-n if a different device was selected and designated as the designated device 300 by the management server 400.

Figure 2:
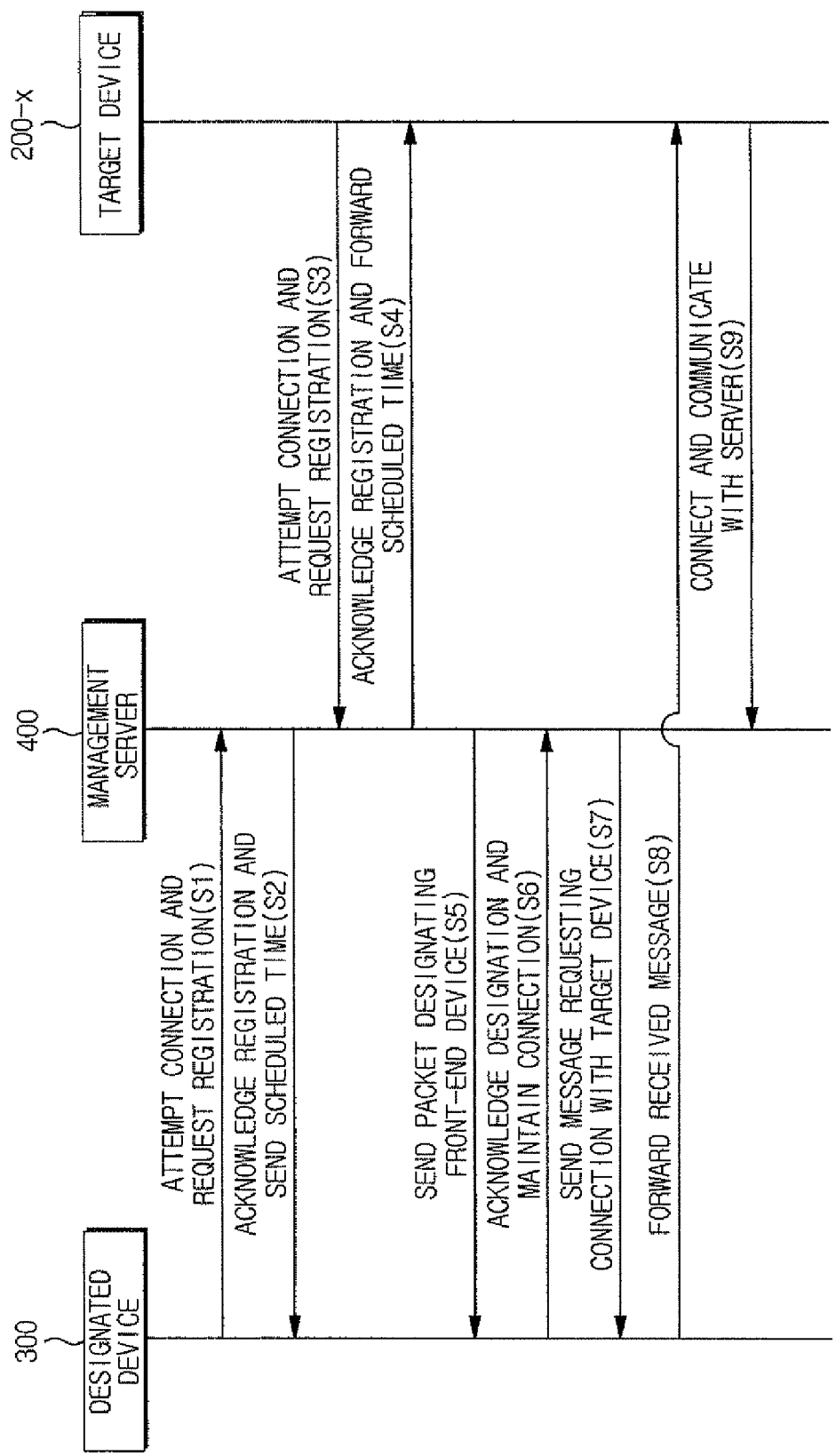
FIG. 2 illustrates an example sequence of communication between the network devices shown in FIG. 1.

FIG. 2 illustrates an example sequence of communication between the network devices shown in FIG. 1. Referring to FIGS. 1 and 2, the device 300 connected to the group network 10 attempts to connect to the management server 400, and after the connection is made, it requests registration with the management server 400 by sending registration information to the management server 400 (S1). The management server 400 stores the registration information in a database, and then sends a registration acknowledgement (ACK) and schedule information to the device 300 (S2). The registration ACK indicates that the registration has been completed, and the schedule information indicates the time that the device 300 should reconnect to the management server and the state information to be provided during the reconnection if the connection between the device 300 and the management server 400 is interrupted.

When the device 200-1 among the devices 200-1 ... 200-*n* connects to the management server 400 and requests registration by sending registration information from the device 200-1 (S3), the management server 400 stores the registration information of the device 200-1, and then sends a registration acknowledgement (ACK) and the schedule information to the device 200-1 (S4). Since the registration of other devices 200-2 ... 200-*n* is performed in a similar manner as described above, the detailed explanation thereof will be omitted.

If at least one device among the devices 200-1 ... 200-*n* and the device 300 are registered with the management server 400, the management server 400 selects one of the registered devices and informs the selected device that it is a designated device (S5). This means that no device considers itself a designated device 300 until the selection and designation (S5) is performed. The designation (S5) is performed by the management server 400 sending a message to inform the selected device that it has been designated. Then, the selected and designated device 300 sends a designation acknowledgement (ACK) indicating that the message has been received from the management server 400, and the designated device 300 thereafter maintains a connection with the management server 400 (S6).

If the management server 400 desires to connect with a target device 200-*x* among the registered devices 200-1 ... 200-*n* after the designated device 300 is maintaining a connection (S6), it sends a connection request message requesting a connection with the target device 200-*x* to the designated device 300 (S7). The designated device 300 forwards the connection request message to the target device 200-*x* which corresponds to the connection request message (S8). The target device 200-*x* connects and communicates with the management server 400 in response to the received connection request message (S9). That is, although the scheduled time for the target device to communicate with the management server has not yet been reached, the target device 200-*x* connects to and communicates with the management server 400 in accordance with the connection request message forwarded from the designated device 300.

In an aspect of the present invention, the designated device 300 and the at least one device 200-1 ... 200-*n* connect with the management server 400 for a predetermined amount of time, and this predetermined connection time can be extended when it expires.

In an example embodiment of the present invention, the device 300 and the at least one device 200-1 ... 200-*n* connect and communicate with the management server 400 on the basis of TCP/IP (Transmission Control Protocol/Internet Protocol). This allows the designated device 300 to connect with the management server 400 through a TCP connection, and the requests and messages are in the format of packets. Since the designated device 300 and the management server 400 communicate with each other on the basis of TCP/IP, they are in a state that the TCP connection between them has been made. Therefore the designated device 300 and the management server 400 can maintain the connection for a set TCP timeout time, and when the TCP timeout time arrives, it can be extended by a request of the management server 400.

Figure 3:
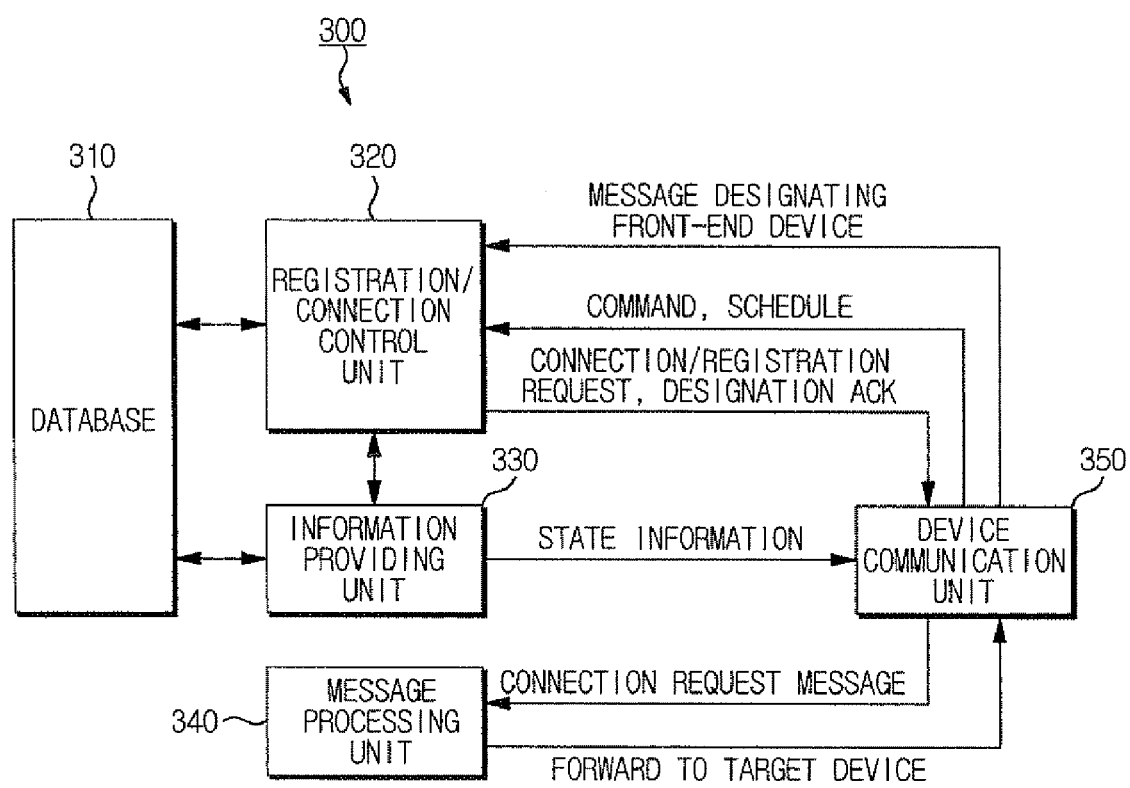
FIG. 3 is a block diagram illustrating the components of the designated device 300 shown in FIG. 1, according to an example embodiment of the present invention.

FIG. 3 is a block diagram illustrating the components of the designated device 300 shown in FIG. 1. Referring to FIGS. 1 to 3, the designated device 300 and the at least one device 200-1 ... 200-*n* are communicably connected through the group network 10, and the designated device 300, the at least one device 200-1 ... 200-*n*, and the management server 400 are communicably connected through the group network 10, the firewall 20, and an external network 30.

The designated device 300 is a device that has been selected as a designated device by the management server 400 and maintains a connection with the management server 400 on behalf of the at least one device 200-1 ... 200-*n*. If a connection request message requesting the connection with a target device 200-*x* is sent by the management server 400, the designated device 300 forwards the connection request message to the target device 200-*x*.

The designated device 300 includes a database (DB) 310, a registration/connection control unit 320, an information providing unit 330, a message processing unit 3401 and a device communication unit 350. In an aspect of the present invention, the designated device 300 can be provided with a memory unit (not illustrated) in which related programs required to perform the above-described operations have been stored.

The DB 310 stores registration information and state information related to the designated device 300. The registration information includes identification information such as the module number, the serial number, and the date of manufacture of the designated device 300. The state information includes information indicating the present state of the designated device 300, such as the remaining amount of toner and the number of printed pages. State information is updated in the database DB 310 in accordance with the state of the designated device 300.

When the device 300 is first installed in the group network 10, the registration/connection control unit 320 controls the device communication unit 350 to attempt to connect with the management server 400. Then, the registration/connection control unit 320 reads the registration information from the DB 310, and controls the device communication unit 350 to request the registration of the designated device 300 with the management server 400 by sending the registration information to the management server 400.

After the device 300 is registered in the management server 400, the registration/connection control unit 320 controls the device communication unit 350 to connect with the management server 400 at the scheduled times. The scheduled times may be designated by the management server 400 or by the device 300. In the example embodiment shown in the present invention, the scheduled time is designated by the management server 400.

If the device 300 is selected and informed by the management server 400 that it is a designated device, the registration/connection control unit 320 controls the device communication device 350 to maintain a connection with the management server 400. That is, when the registration/connection control unit 320 receives a designation message sent by the management server 400 through the device communication unit 350, device 300 operates as a designated device 300, and the registration/connection control unit 320 controls the device communication unit 350 not to terminate and to maintain the connection with the management server 400.

In addition, the registration/connection control unit 320 outputs requests, commands, and schedule information received from the management server 400 through the device communication unit 350 to the information providing unit 330.

The information providing unit 330 reads from the DB 310 the state information of the designated device 300 corresponding to a received request, command, or schedule, and provides the state information to the device communication unit 350. The device communication unit 350 then sends the state information to the management server 400.

The message processing unit 340 analyzes the message requesting the connection with the target device 200-*x* among the at least one device 200-1 . . . 200-*n* which has been sent by the management server 400 through the device communication unit 350. If the message for requesting the connection with the target device 200-*x* among the at least one device 200-1 . . . 200-*n* is determined to correspond with the target device 200-*x*, the message processing unit 340 controls the device communication unit 350 to forward the connection request message to the target device 200-*x*.

The device communication unit 350 requests the connection to the management server 400 under the control of the registration/connection control unit 320, and sends the registration information and the state information to the management server 400: In addition, when the device communication unit 350 receives a message requesting the report of the state information from the management server 400 or a scheduled time for a later communication with the management server 400, it outputs the received message or the scheduled time to the registration/connection control unit 320. In the present example embodiment, the device communication unit 350 connects with the management server 400 through the group network 10, the firewall 20, and the external network 30.

In the present example embodiment, the device communication unit 350 analyzes characteristics of the request or the message sent by the management server 400 and outputs the request or the message by the analyzed characteristics.

More specifically, after connecting with the management server 400, the device communication unit 350 outputs various kinds of command and schedule information sent by the management server 400 to the registration/connection control unit 320. Then, the device communication unit 350 sends the registration information, state information, and various kinds of acknowledgements outputted from the registration/connection control unit 320 and the information providing unit 330 to the management server 400, and forwards the connection request message output from the message processing unit 340 to the target device 200-*x*.

If the device communication unit 350 receives a message reporting that the device 300 that is one of the at least one device 200-1 . . . 200-*n* that has been selected and designated by the management server 400, it outputs the received designation message to the registration/connection control unit 320.

In addition, if the device communication unit 350 receives a message requesting a connection with the target device 200-*x* among the at least one device 200-1 . . . 200-*n* from the management server 400, it outputs the received message to the message processing unit 340.

In one example embodiment of the present invention, the registration/connection control unit 320, the information providing unit 330, and the message processing unit 340 of the designated device 300 can be implemented in single electronic component.

Figure 4:
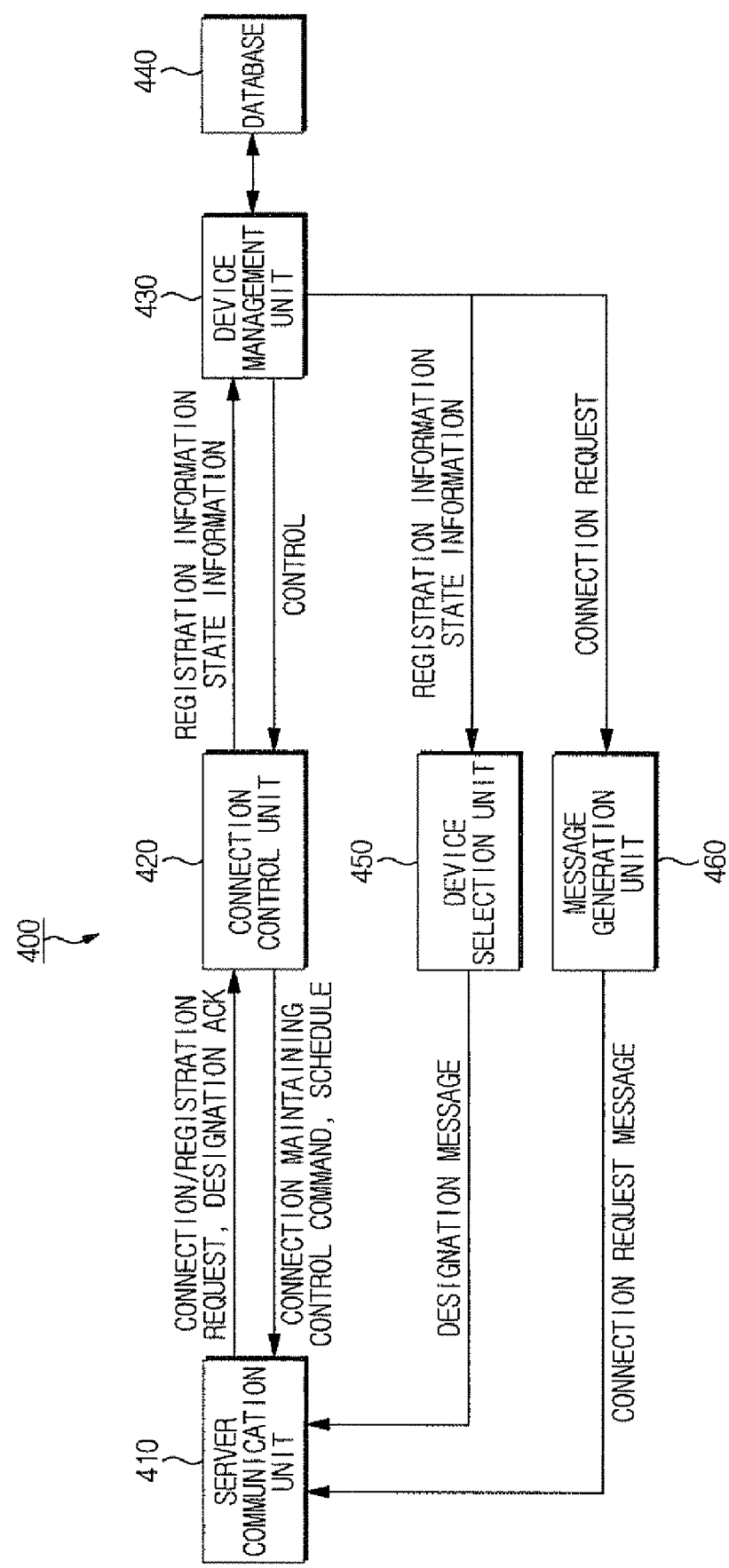
FIG. 4 is a block diagram illustrating the components of the management server 400 shown in FIG. 1, according to an example embodiment of the present invention.

FIG. 4 is a block diagram illustrating the components of the management server 400 shown in FIG. 1. First, the management server 400 is a server that manages the designated device 300 and the at least one device 200-1 . . . 200-*n* connected to the group network 10, and maintains a connection with the designated device 300 selected and designated by the management server 400. If a connection with the target device 200-*x* among the devices 200-1 . . . 200-*n* is required, the management server 400 generates and sends a message for requesting the connection with the target device 200-*x* to the designated device 300. This allows the management server 400 to connect and communicate with the target device 200-*x* before the scheduled time.

Referring to FIGS. 1 to 4, an example embodiment of the management server 400 includes a server communication unit 410, a connection control unit 420, a device management unit 430, a database (DB) 440, a device selection unit 450, and a message generation unit 460. In an aspect of the present invention, the management server 400 can be provided with a memory unit (not illustrated) in which to store related programs required to perform the above-described operations.

If a message for requesting a connection, reporting registration information, or reporting the state information is received from the designated device 300 or one of the at least one device 200-1 . . . 200-*n*, the server communication unit 410 outputs the received connection request, reported registration information, or reported state information to the connection control unit 420.

When the device 300, before it has been selected and designated, first attempts to connect to the management server, a message requesting a connection is input from the server communication unit 410 and the connection control unit 420 controls the server communication unit 410 to make a connection with the device 300. Then, the connection control unit 420 provides the registration information and the state information sent from the device 300 to the device management unit 430.

In addition, the connection control unit 420 controls the server communication unit 410 to provide various kinds of requests, commands, and schedule information to the designated device 300 and the at least one device 200-1 . . . 200-*n*.

The device management unit 430 outputs the registration information and the state information sent by the designated device 300 to the DB 440, and manages the designated device 300 and the at least one device 200-1 . . . 200-*n* on the basis of the state information stored in the DB 440. That is, the device management unit 430 generates and provides to the connection control unit 420 various kinds of requests, commands, and schedule information to be sent to the designated device 300 or sent to the designated device 300 to be forwarded to the at least one device 200-1 . . . 200-*n* on the basis of the state information stored in the DB 440. The connection control unit 420 controls the server communication unit 410 to send the provided requests, commands, and schedule information to the corresponding device.

In addition, the device management unit 430 provides the registration information and the state information of the respective devices 300 and 200-1 . . . 200-*n* to the device selection unit 450 whenever the device 300 or the at least one device 200-1 . . . 200-*n* are registered.

After the device 300 is selected by the device selection unit 450 (device selection unit 450 will explained later), the device management unit 430 controls the message generation unit 460 to generate a message for requesting a connection to the target device 200-*x* if it is judged that various kinds of commands are to be sent to the target device 200-*x* by the state information stored in the DB 440.

The DB 440 stores the registration information and the state information sent by the device 300 and the at least one device 200-1 . . . 200-*n* provided from the device management unit 430. Accordingly, when the device 300 or the at least one device 200-1 . . . 200-*n* first connect with the management server 400 they are registered by the management server 400. Since the state information stored in the DB 440 is provided by the designated device 300 and the at least one device 200-1 . . . 200-*n* at scheduled times, it is periodically updated based on the information provided at the scheduled times.

The device selection unit 450 selects the designated device 300 on the basis of the registration information or the state information of the device 300 and the at least one device 200-1 . . . 200-*n* provided from the device management unit 430. Also, the device selection unit 450 generates a designation packet for reporting that the device selected by a predetermined method has been selected as the designated device and provides the generated designation message to the server communication unit 410.

The server communication unit 410 sends the designation message generated by the device selection unit 450 to the selected device 300. If a designation acknowledgement indicating that the designation message has been received is received from the selected designated device 300 after a predetermined time elapses, a continuous connection between the designated device 300 and the management server 400 is maintained.

An example embodiment of the present invention, the device selection unit 450 selects the device first registered in the management server 400 as the designated device 300. That is, the device selection unit 450 selects the device that corresponds to the registration information first provided from the device management unit 430 as the designated device.

In another example embodiment of the present invention, the device selection unit 450 analyzes the registration and the state information of the device 300 and the at least one device 200-1 . . . 200-*n* provided from the device management unit 430, and selects and designates a device, based on the analysis, as the designated device. In another aspect of the present invention, the device selection unit 450 may select the device 300 as a designated device for a predetermined period and perform another analysis at the end of the predetermined period and, based on the analysis, select the same device 300 or one of the at least one device 200-1 . . . 200-*n* as a designated device.

The message generation unit 460 generates a message for requesting a connection with the target device 200-*x* under the control of the device management unit 430 and provides the generated message to the server communication unit 410.

The server communication unit 410 sends the message for requesting the connection with the target device 200-*x* to the designated device 300 which is maintaining a connection to the server communication unit 410.

If a connection request is received from the target device 200-*x*, either after the device management unit 430 has requested a connection or at a scheduled time, the server communication unit 410 provides the received packet to the connection control unit 420. The connection control unit 420 controls the server communication unit 410 to permit connection with the target device 200-*x* in accordance with the received request. Then, the device management unit 430 generates various kinds of commands and schedule information to be sent to the target device 200-*x* on the basis of the stored state information, and the connection control unit 420 controls the server communication unit 410 to send the generated command and the schedule information to the target device 200-*x*.

Figure 5:
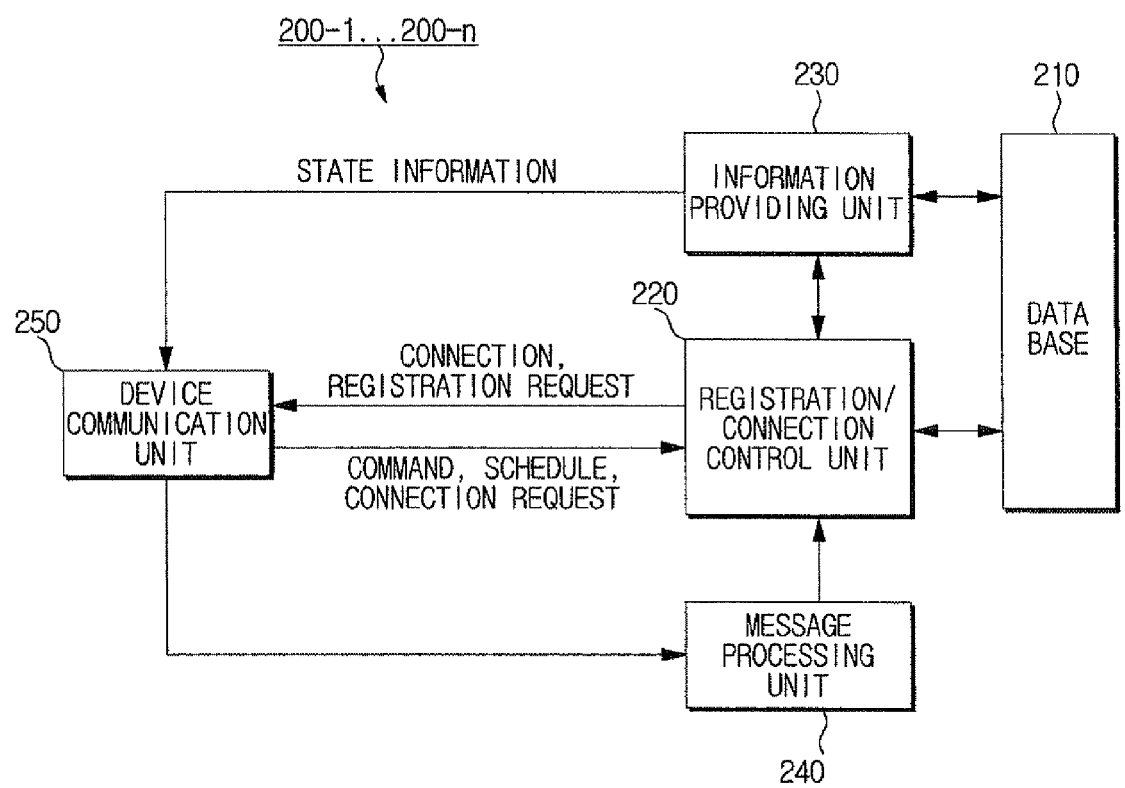
FIG. 5 is a block diagram illustrating the components of the devices 200-1 . . . 200-n shown in FIG. 1, according to an example embodiment of the present invention.

FIG. 5 is a block diagram illustrating the components of the devices 200-1 . . . 200-*n* shown in FIG. 1. The at least one device 200-1 . . . 200-*n* is a device or devices that accesses and communicates with the management server 400 at scheduled times, and is connected to the device 300 through the group network 10.

Referring to FIGS. 1 to 5, the device 200-*x* (200-*x* being one device of the at least one device 200-1 to 200-*n*) includes a database DB 210, a registration/connection control unit 220, an information providing unit 230, a message processing unit 240, and a device communication unit 250. In an aspect of the present invention, the device 200-*x* can be provided with a memory unit (not illustrated) in which related programs required to perform the above-described operations are stored.

The DB 210, registration/connection control unit 220, information providing unit 230, message processing unit 240, and device communication unit 150 as illustrated in FIG. 5 perform similar operations to the DB 310, registration/connection control unit 320, information providing unit 330, message processing unit 340, and device communication unit 350 as illustrated in FIG. 3, and thus the detailed explanations thereof will be omitted.

If a forwarded connection request message sent from the management server 400 and forwarded from the device communication unit 350 of the designated device 300, the device communication unit 250 provides the forwarded connection request message to the registration/connection control unit 220. The registration/connection control unit 220 controls the device communication unit 250 to connect with the management server 400 if it is confirmed that the provided connection request message is a message for requesting the connection with the management server 400.

If various kinds of commands and schedule information are sent by the management server 400 after the registration/connection control unit 220 connects with the management server 400, the registration/connection control unit 220 reads the state information that corresponds to the sent command and the schedule information from the DB 210, and controls the device communication unit 250 to send the state information to the management server 400.

As described above, although the scheduled time set before the connection request message is received by the management server 400 and the target device 200-*x* has not arrived, the target device 200-*x* can communicate with the management server 400 by a connection request from the management server 400.

Figure 6:
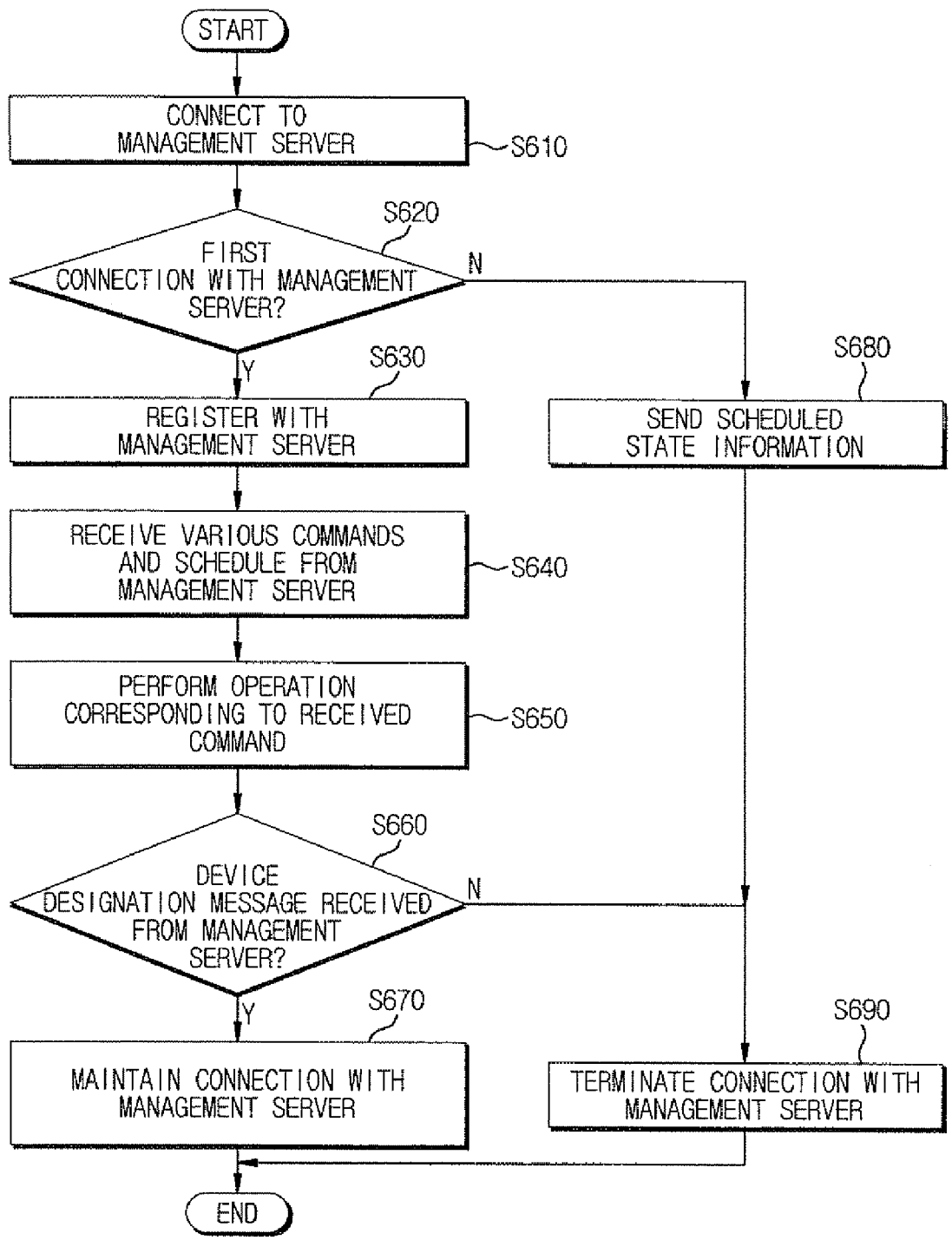
FIG. 6 is a flowchart illustrating a process of selecting and designating a device 300 shown in FIG. 1 as a designated device to maintain a connection with the management server, according to an example embodiment of the present invention.

FIG. 6 is a flowchart illustrating a process of selecting and designating the device 300 of FIG. 1 as the designated device to maintain a connection with the management server. Referring to FIGS. 1 to 6, the registration/connection control unit 320 of the device 300 controls the device communication unit 350 to connect with the management server 400 through the group network 10, the firewall 20, and the external network 30 (S610). If the connection (S610) is the first connection made between the device 300 and the management server 400 (S620), the registration/connection control unit 320 controls the device communication unit 350 to make a registration request by sending the registration information stored in the DB 310 to the management server 400 (S630). At this point, the device 300 has not been selected as a designated device.

If various kinds of requests, commands, and schedule information are received from the management server 400 through the external network 30, firewall 20, group network 10, and device communication unit 350 after registration (S630), the registration/connection control unit 320 performs the operation that corresponds to the received request or command, or controls the device communication unit 350 to send the state information to the management server 400 (S640 and S650).

If a designation message, a message that informs the device that the device has been selected and designated by the management server 400 to maintain a connection with the management server 400, is received (S660), the registration/connection control unit 320 controls the device communication unit 350 to maintain a connection with the management server 400 (S670). In an example embodiment of the present invention, the designated device 300 and the management server 400 are connected together by a TCP/IP connection.

If the connection (S610) is not the connection first made between the device 300 and the management server 400 (S620), the registration/connection control unit 320 controls the device communication unit 350 to send the scheduled state information of the device 300 to the management server 400 (S680). Since the device 300 has not been selected and designated by the management server 400, the registration/connection control unit 320 controls the device communication unit 350 to terminate the connection with the management unit 400 (S690).

Figure 7:
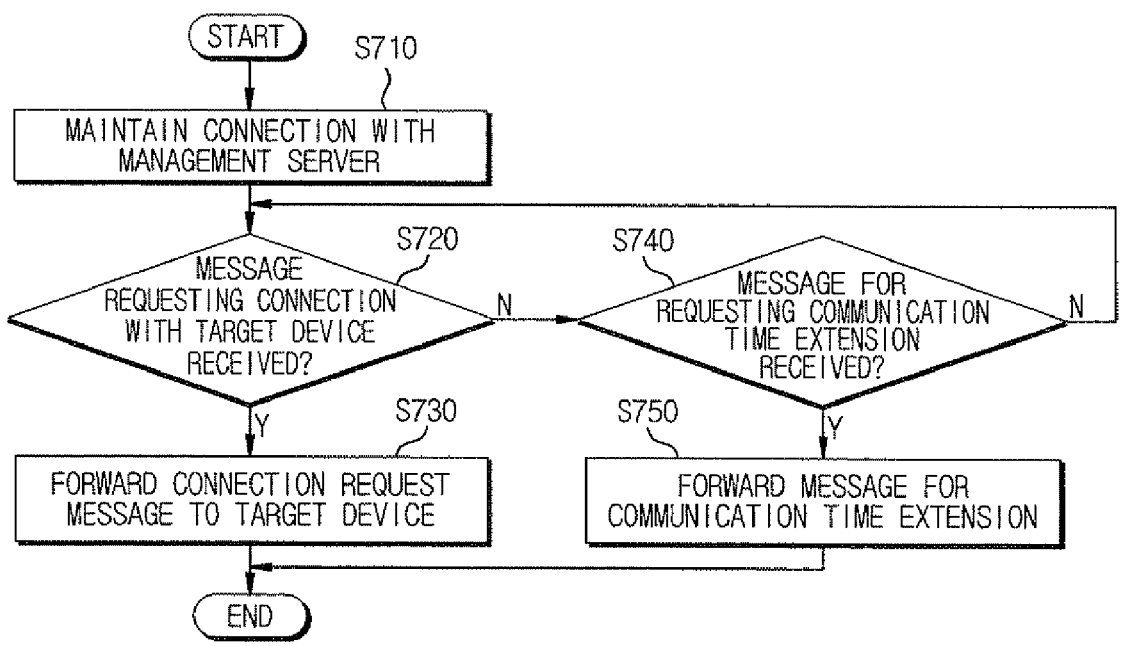
FIG. 7 is a flowchart illustrating a process of how designated device 300 processes and responds to a message received from a management server 400, according to an example embodiment of the present invention.

FIG. 7 is a flowchart illustrating how a designated device 300 processes and responds to a messages received from a management server 400. Referring to FIGS. 1 to 7, the device communication unit 350 of the designated device 300 maintains a connection with the management server 400 under the control of the registration/connection control unit 320 (S710).

If a connection request message requesting a connection with the target device 200-$x$ is received from the management server 400 while the connection with the management server 400 is maintained (S720), the device communication unit 350 provides the received connection request message to the message processing unit 340. The message processing unit 340 confirms that the destination of the connection request message is the target device 200-$x$, and controls the device communication unit 350 to forward the connection request message to the target device 200-$x$ (S730). If the target device 200-$x$ does not send an acknowledgement reporting the reception of the connection request message, the device communication unit 350 retransmits the connection request message.

If a message for requesting a extension of a TCP timeout is received from the management server 400 (S740), the registration/connection control unit 320 controls the device communication unit 350 to send a message permitting the extension of the TCP timeout to the management server 400 (S750). Accordingly, a connection is maintained between the management server 400 and the designated device 300.

In addition, if a message for requesting the state information of the device 300 or various kinds of commands is received from the management server 400, the device 300 performs the process corresponding to the requested message and then responds to the management server 400.

Figure 8:
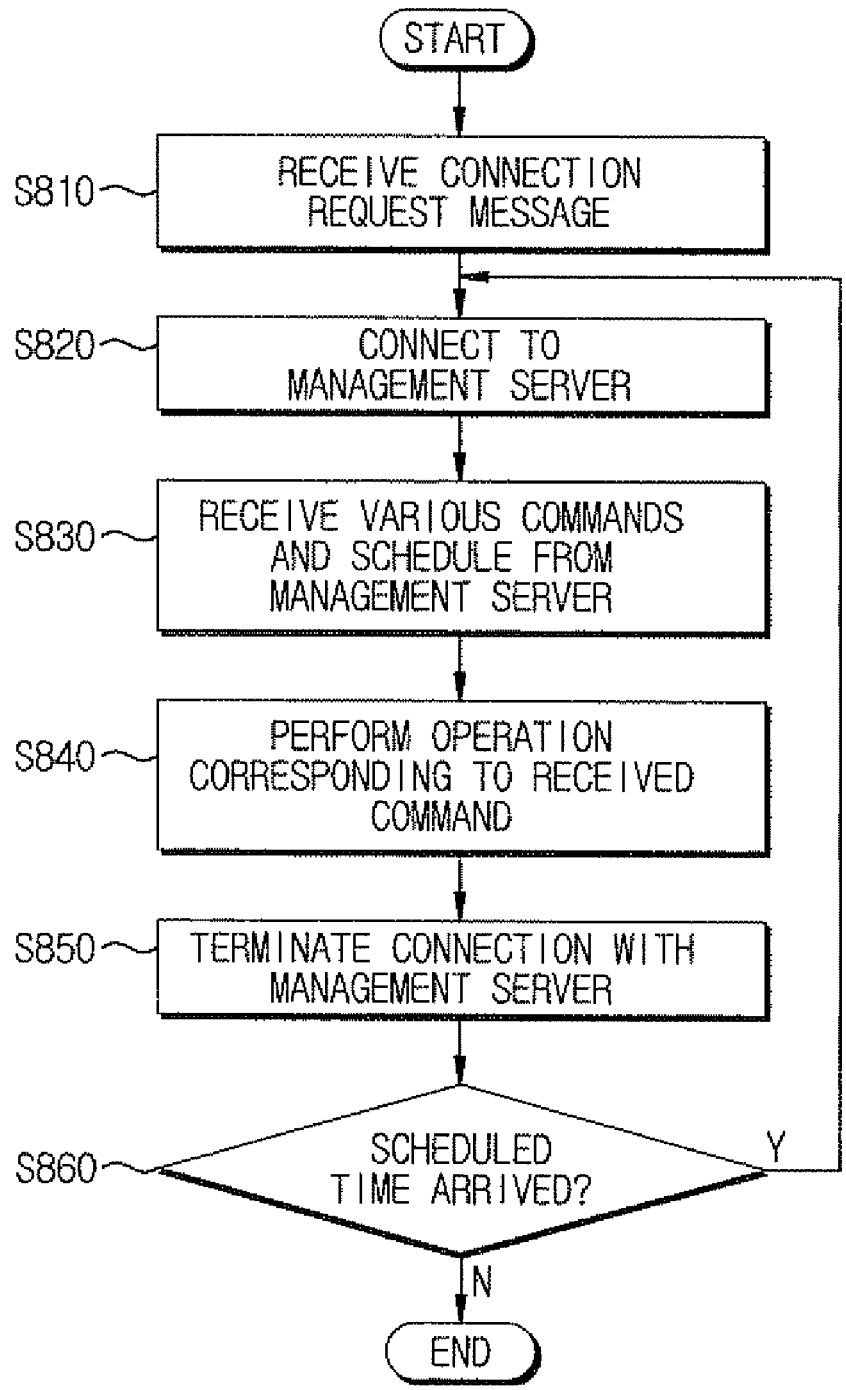
FIG. 8 is a flowchart explaining the operation of a target device 200-x among 200-1 . . . 200-n shown in FIG. 1 when the target device 200-x has received a connection request message, according to an example embodiment of the present invention.

FIG. 8 is a flowchart explaining the operation of a target device 200-$x$ among 200-1 ... 200-$n$ shown in FIG. 1, when the target device 200-$x$ has received a connection request message. Referring to FIGS. 1 to 8, the device communication unit 250 receives a connection request message sent by the management server 400 forwarded from the designated device 300, and provides the received message to the registration/connection control unit 220 (S810). The registration/connection control unit 220 analyzes the provided connection request message, and if it is confirmed that the connection request message is a message for requesting the connection with the management server 400, it controls the device communication unit 250 to connect with the management server 400 (S820).

If various kinds of commands and schedule information are received from the management server 400 after the connection with the management server 400 is made (S820), the registration/connection control unit 220 performs the operation that corresponds to the received command or schedule information (S840). For example, if the management server 400 requests the forwarding of the state information stored in the DB 210, the registration/connection control unit 220 controls the device communication unit 250 to forward the state information stored in the DB 210.

After updating the received schedule information, the registration/connection control unit 220 controls the device communication unit 250 to terminate the connection with the management server 400 (S850). The updated schedule information includes the time for a reconnection with the management server 400 after the device 200-$x$ terminates the connection with the management server 400, i.e., scheduled time information.

After terminating the connection with the management server (S850), when the scheduled time for connecting with the management server 400 is reached, the device 200-$x$ connects to the management server (S820) and operates in a similar manner to receiving a connection request, as described above.

As described above, according to the communication method for a device in a network system and the system for managing network devices according to the present invention, the problem that the management server cannot request a connection to the managed devices due to the firewall can be improved. That is, if the management server requests a connection with the target device via the designated device, the designated device informs the target device of the connection request, and thus the target device attempts to connect and communicate with the management server although the scheduled time has not arrived. Accordingly, it is not required for the manager of the management server to wait until the target device connects with the management server at the scheduled time, and thus the manager of the management server can efficiently manage the multiple devices including the target device.

Various components of the designated device 300, the at least one device 200-1 ... 200-$n$, and the management server, as shown in FIG. 3 through FIG. 5, such as the connection control unit 420 of FIG. 5 can be integrated into a single control unit, or alternatively, can be implemented in software or hardware, such as, for example, a field programmable gate array (FPGA) and an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface cards modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, a network switch could be substituted for the gateway shown as 10a on FIG. 1. In another example, the internal network which communicably connects the device 300 and the at least one device 200-1 . . . 200-n could be a wireless network. Alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Furthermore, the software modules as described can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A communication method for a device in a network system, comprising:
managing devices on an internal network with a management server on an external network via the external network, a firewall and the internal network, where access to the internal network from the external network is restricted by the firewall;
connecting to and maintaining a connection with the management server, via a designated device on the internal network;
forwarding a request or a message to a target device on the internal network, via the designated device, when the management server requests to communicate with or send a message to the target device on the internal network;
connecting the target device to the management server after the target device receives a request to communicate forwarded from the designated device; and
responding to additional requests or messages transmitted from the management server to the target device.

2. The communication method as of claim 1, wherein the designated device receives the request or the message from the management server to be forwarded to a target device, analyzes the request or the message, and forwards the request or message to the target device, if the designated device determines that the received request or the message corresponds to the target device.

3. The communication method of claim 1, wherein the management server selects and designates any device on the internal network to first connect and register with the management server as the designated device, so as to maintain a connection with the management server.

4. The communication method of claim 1, wherein the management server analyzes the registration and the state information reported by the devices on the internal network and then, based on the analysis, selects and designates a device as the designated device to maintain a connection with the management server.

5. The communication method of claim 1, wherein the management server, based on the state information received from the target device, requests a connection to the target device, and the designated device forwards the request for the connection to the target device.

6. The communication method of claim 1, wherein the management server and the designated device remain connected for a predetermined time period, and this time period is extendable.

7. The communication method of claim 1, wherein the management server, the designated device, and the at least one of the one or more target devices communicate via TCP/IP (Transmission Control Protocol/Internet Protocol).

8. The communication method of claim 1, wherein one or more of the devices managed on the internal network are image forming devices.

9. The communication method of claim 1, wherein the designated device is an image forming device.

10. A system to manage network devices, comprising:
at least one target device connected to an internal network;
a management server connected to an external network;
a firewall disposed between the internal network and external network; and
a designated device connected to the internal network, and arranged to maintain a connection with the management server on behalf of the at least one target device, and forward requests and messages from the management server to the at least one target device,
wherein the management server manages the at least one target device which is connected to the internal network via the external network, the firewall and the internal network, and
the designated device comprises
a device communication unit to receive the requests and the messages, and transmit the requests and the messages to the at least one target device;
a message processing unit to confirm receipt of the requests and the messages, and forward the requests and messages to the at least one target device corresponding to the received requests and the messages, via the device communication unit;

a registration/connection control unit to connect to and maintain a connection with the management server, via the device communication unit;

a database to store the registration and the state information of the designated device; and an information providing unit to retrieve the registration and the state information from the database, and report the registration and the state information to the registration/connection control unit, when requested by the registration/connection control unit.

11. The system of claim 10, wherein the designated device connects to and maintains a connection with the management server if the designated device receives a message that the management server has selected and designated the designated device to create and maintain a connection.

12. The system of claim 10, wherein the at least one target device comprises:

a device communication unit to receive the requests and the messages, and provide the requests and the messages to the registration/connection control unit;

a message processing unit to confirm receipt of the requests and the messages, and provide the requests and messages to the registration/connection control unit;

a registration/connection control unit to connect to the management server, via the device communication unit;

a database to store the registration and the state information of the target device; and an information providing unit to retrieve the registration and the state information from the database, and report the registration and the state information to the registration/connection control unit, when requested by the registration/connection control unit.

13. The system of claim 10, wherein the at least one target device connects to the management server after receiving a connection request from the management server forwarded from the designated device, and responds to the requests of the management server after connecting to the management server.

14. The system of claim 10, wherein the management server selects and designates any device on the internal network to first connect and register with the management server as the designated device, so as to maintain a connection with the management server.

15. The system of claim 10, wherein the management server analyzes the registration and the state information reported by the devices on the internal network and then, based on the analysis, selects and designates one of the devices on the internal network to maintain a connection with the management server.

16. The system of claim 10, wherein the management server and the designated device are connected together for a predetermined time period, and this time period for connection is extendable.

17. The system of claim 10, wherein the management server, the designated device, and the at least one of the one or more target devices communicate via TCP/IP (Transmission Control Protocol/Internet Protocol).

18. The system of claim 10, wherein at least one of the one or more target device is an image forming device.

19. The system of claim 10, wherein the designated device is an image forming device.

20. A system to manage network devices, comprising:

at least one target device connected to an internal network;

a management server connected to an external network;

a firewall disposed between the internal network and external network; and a designated device connected to the internal network, and arranged to maintain a connection with the management server on behalf of the at least one target device, and forward requests and messages from the management server to the at least one target device, wherein the management server manages the at least one target device which is connected to the internal network via the external network, the firewall and the internal network, and the management server comprises a server communication unit to send the requests and the messages and receives the state information, via connections formed by devices on the internal network;

a device selection unit to select the designated device, and generate a message for the selected device to inform the selected device that the selected device has been designated;

a device management unit to, based on state information stored in the management server database, issue the requests and the messages to devices on the internal network, via the server communication unit;

a message generation unit to, when directed by the device management unit, send connection requests to the at least one target device on the internal network, via the server communication unit; and a database to store the registration and the state information of the designated device and the at least one target device.

* * * * *